(12) United States Patent
Crabtree et al.

(10) Patent No.: US 6,241,296 B1
(45) Date of Patent: Jun. 5, 2001

(54) SNOWMOBILE EXTRICATING APPARATUS AND METHOD

(75) Inventors: Richard W. Crabtree; Dana M. Reed, both of Casper, WY (US)

(73) Assignee: Snobunje Incorporated, Casper, WY (US)

( * ) Notice: Subject to any disclaimer, the term of this patent is extended or adjusted under 35 U.S.C. 154(b) by 0 days.

(21) Appl. No.: 09/330,208

(22) Filed: Jun. 11, 1999

(51) Int. Cl.$^7$ ................................. B60D 1/18; B65G 7/00
(52) U.S. Cl. ............................. 294/1.1; 267/69; 280/480; 294/26
(58) Field of Search ............................. 294/1.1, 15, 19.1, 294/26, 74, 82.11; 24/371; 267/69, 73, 74; 280/47.17, 47.18, 47.315, 47.34, 47.371, 292, 416, 477, 480, 482

(56) References Cited

U.S. PATENT DOCUMENTS

| | | | |
|---|---|---|---|
| 1,598,480 | * 8/1926 | Deal | 267/74 |
| 1,962,585 | * 6/1934 | Faure-Roux | 294/74 X |
| 2,751,218 | * 6/1956 | Pass | 280/480 X |
| 2,991,524 | * 7/1961 | Dobrikin | 267/69 X |
| 3,353,817 | * 11/1967 | Bollinger | 267/69 |
| 3,718,945 | * 3/1973 | de Treglode | 294/74 X |
| 4,093,292 | * 6/1978 | Marcet et al. | 294/74 |
| 4,354,704 | * 10/1982 | Mayerjak | 294/74 |
| 5,308,101 | * 5/1994 | Monty | 267/74 X |
| 5,351,365 | * 10/1994 | Hauck | 294/82.11 X |
| 5,560,441 | 10/1996 | Moody et al. . | |
| 5,697,597 | 12/1997 | Goodbold . | |
| 6,050,587 | * 4/2000 | Panhausen | 294/74 X |

\* cited by examiner

*Primary Examiner*—Johnny D. Cherry
(74) *Attorney, Agent, or Firm*—Harold A. Burdick

(57) ABSTRACT

Extricating apparatus and methods are disclosed for aiding movement of a snowmobile after becoming bogged in deep and/or soft snow. The apparatus includes at least a first unit having a stretchable cord with first and second implements joined thereto at opposite ends of the cord. A flexible jacket is provided around but unconnected to the stretchable cord and intermediate the first and second implements, the jacket being made of material that is relatively more rigid than the stretchable cord. The implements are preferably either first and second couplers or a coupler and a graspable member such as a handle, first and second units, one each thus equipped, being preferred.

17 Claims, 5 Drawing Sheets

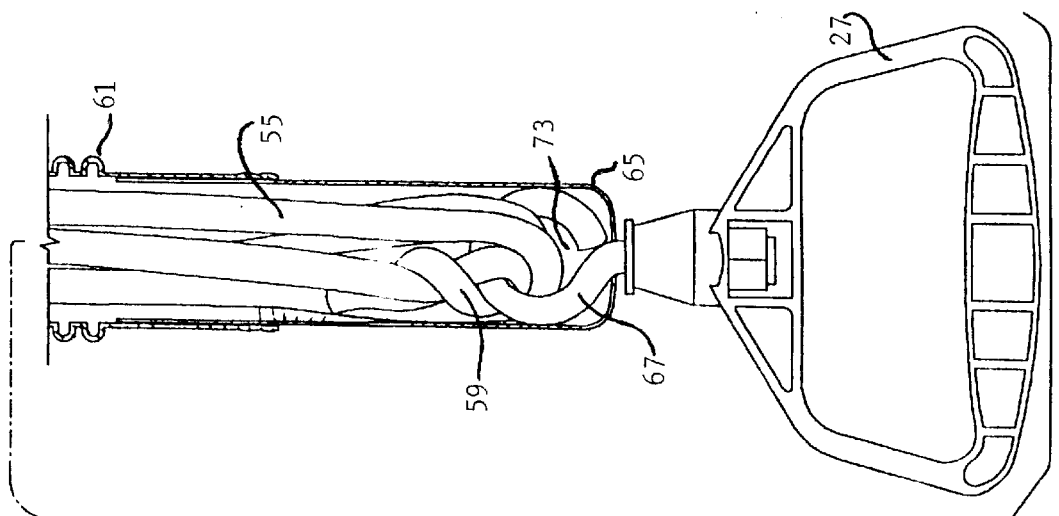
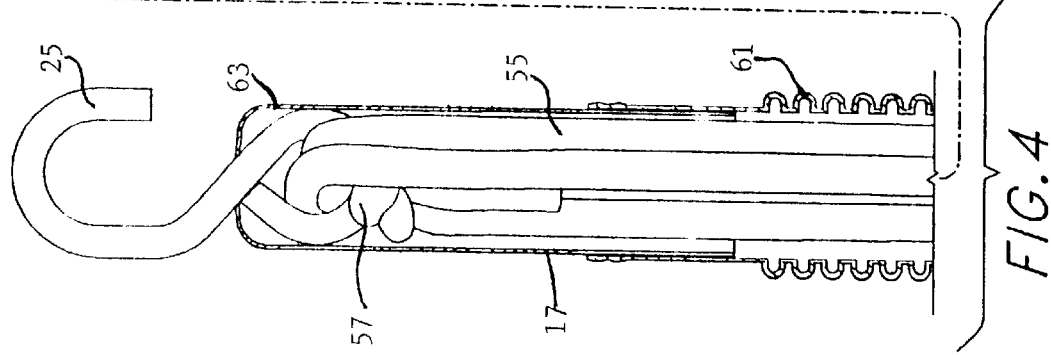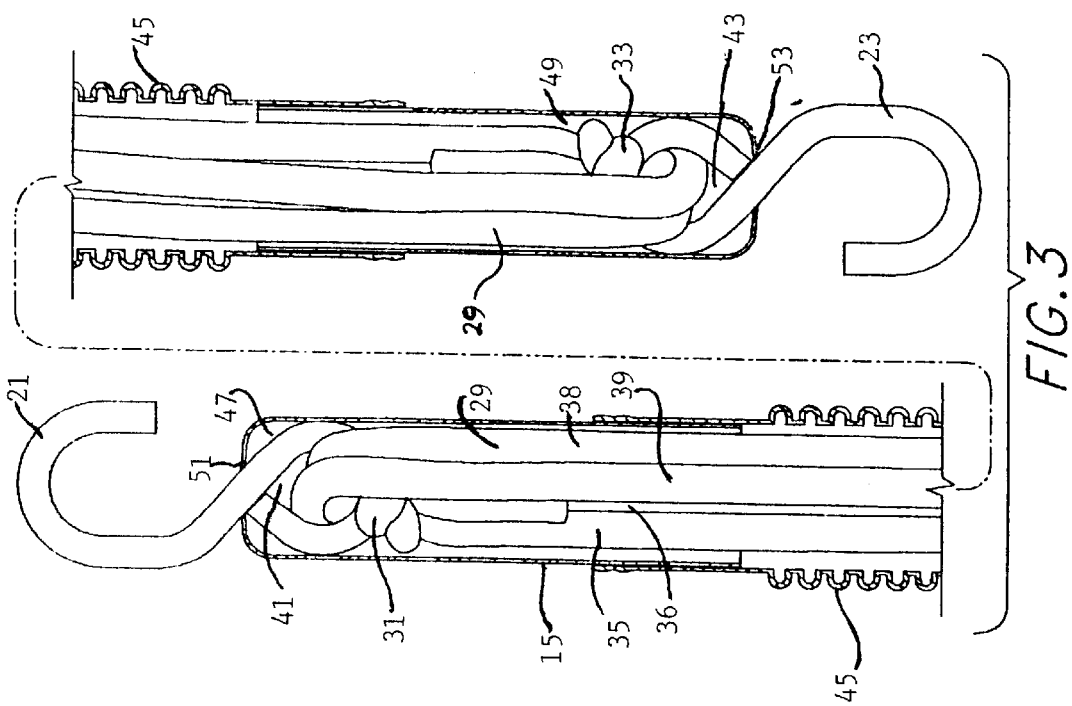

SNOWMOBILE EXTRICATING APPARATUS AND METHOD

FIELD OF THE INVENTION

This invention relates to devices and methods adapted for freeing vehicles bogged in deep, loose snow, and, more particularly, relates to apparatus and methods for aiding extrication of an entrenched snowmobile.

BACKGROUND OF THE INVENTION

The recreational use of snowmobiles has increased significantly in recent years. The development of this recreation has led to the use of ever more powerful and heavy machines (many typically weighing 600 lbs. or more). Any snowmobile can become mired in deep or soft snow when the vehicle's drive track loses traction and the snowmobile settles in the snow. The advent of larger vehicles and the capability of travel further afield (where ungroomed or previously untracked terrain is often encountered) has made such entrenchment of snowmobiles an even more difficult problem for riders to resolve.

When so entrenched, the snowmobile's rear body, including the drive track, is typically settled deeper into the snow than is the front end of the vehicle (including the skis) due to the significant weight differential of the vehicle from front to rear. Heretofore, by far the most common way to free the snowmobile at this point has been to have someone assist by standing at the front of the vehicle and pull forward on a ski as best possible given the tractionless environment. Thus, the only assisting force (i.e., in addition to the operation of the entrenched vehicle itself) is often that usually uneven and non—constant force such a person can develop directly at the front of the snowmobile working from the same deep and/or soft snow that has trapped the vehicle in the first place. The task, as may be appreciated, is often not a simple one, taking many attempts to extract the snowmobile. Moreover, it is not unheard of for the assisting person to become an obstacle or even be run over as the vehicle is freed.

Various devices and apparatus have heretofore been suggested and or utilized to provide a more reliable, safe and/or simplified process of extrication of snowmobiles when thus bogged in deep and/or soft snow. Such devices have included winching and/or ratcheting mechanisms (see, for example, U.S. Pat. Nos. 5,560,441 and 5,697,597), and standard ropes, cables, tow straps and the like. However, some such apparatus are cumbersome to carry and/or utilize, and may be unduly complex for application in the field and under widely varying conditions.

Many of the others, such as standard fiber cordage, cable, straps and the like, while moving the assistant away from the front of the snowmobile and/or allowing use of a companion's vehicle to provide a pulling force, do little to overcome the problem of developing sufficient assisting force to move a typical 600 lb. entrenched snowmobile in a tractionless environment. These approaches also include no means of evening out the assisting force (i.e., providing constancy of tension) as the vehicle begins to move, and thus backsliding remains a problem. Further consideration of the particular problems and task of freeing entrenched snowmobiles could thus still be utilized.

SUMMARY OF THE INVENTION

This invention provides improved apparatus and methods for extrication of snowmobiles bogged in deep and/or soft snow. The apparatus is compact, lightweight, and avoids the undue complexity of application in the field and under widely varying conditions that has characterized some heretofore known devices.

The apparatus and methods of this invention allow an assisting party to provide a significant pulling force at a distance away from the front of the snowmobile while using the companion's vehicle to provide additional significant pulling force. Moreover, improvement is achieved in developing assisting forces sufficient to reliably aid movement of a typical 600 lb. entrenched snowmobile in tractionless environments and in providing constancy of assisting forces as the vehicle begins to move.

The apparatus and methods both make use of elastic (i.e., significantly stretchable) cords to allow an assisting party to transfer his or her body weight and/or the weight of a companion's snowmobile into a pulling force of several hundred pounds over a significant distance. The kinetic energy of the cords provides superior tensioning and improved pulling force development over substantially non-elastic materials such as typical cables, fiber robes, straps and the like.

The apparatus of this invention provides a unit including such stretchable cord with first and second implements joined to the stretchable cord at positions spaced from one another. A flexible jacket is provided around but unconnected to the stretchable cord and intermediate the first and second implements. The jacket is of material that is relatively more rigid than the stretchable cord. The implements are preferably either first and second couplers or a coupler and a graspable member such as a handle, depending upon application.

The preferred apparatus for extricating a bogged snowmobile of this invention includes first and second units each including a stretchable cord. One of the units has first and second couplers joined to the stretchable cord at positions spaced from one another while the other unit has a third coupler and a graspable member joined to the stretchable cord at positions spaced from one another. The first and third couplers are securable at the snowmobile while the second coupler is securable at an anchoring location, the graspable member being provided for use by one applying a stretching force to the second unit.

The method for extricating a snowmobile bogged in snow of this invention includes connecting one position of an elastic cord capable of significant elongation with the snowmobile and stretching the elastic cord between the one position and a second position of the elastic cord held at an anchoring location. The bogged snowmobile is then operated to, in combination with the pulling force of the stretched elastic cord, extricate the snowmobile. The stretching of the elastic cord develops up to about 400 lbs. of pulling force and maximum cord elongation of up to at least about 90%.

Additional pulling force is developed by connecting one end of a second elastic cord with the snowmobile and manually pulling on the other end of the second elastic cord to stretch the second elastic cord. An additional pulling force of up to at least about 200 lbs. is thus developed.

It is therefore an object of this invention to provide improved apparatus and methods for extrication of snowmobiles bogged in deep and/or soft snow.

It is another object of this invention to provide snowmobile extricating apparatus that are compact, lightweight, and safe and simple to utilize in the field and under widely varying conditions.

It is another object of this invention to provide snowmobile extricating apparatus and methods that allow an assisting party to provide a significant pulling force at a distance away from the front of the snowmobile while using the companion's vehicle to provide additional significant pulling force.

It is still another object of this invention to provide snowmobile extricating apparatus and methods for developing sufficient assisting force to reliably aid movement of a typical entrenched snowmobile in a typical tractionless environment.

It is another object of this invention to provide snowmobile extricating apparatus and methods enabling the evening of assisting forces over distance to provide improved constancy of applied tension as the vehicle begins to move from its entrenchment.

It is still another object of this invention to provide a unit for extricating a snowmobile bogged in snow including a stretchable cord, first and second implements joined to the stretchable cord at positions spaced from one another, and a flexible jacket around but unconnected to the stretchable cord and intermediate the first and second implements, the jacket being relatively more rigid than the stretchable cord.

It is yet another object of this invention to provide an apparatus for extricating a bogged snowmobile including a first unit having a stretchable cord and first and second couplers joined to the stretchable cord at positions spaced from one another, the first coupler being securable at the snowmobile and the second coupler being securable at an anchoring location, and further including a second unit having a stretchable cord with a third coupler and a graspable member joined thereto at positions spaced from one another, the third coupler being securable at the snowmobile and the graspable member for use by one applying a stretching force to the second unit.

It is still another object of this invention to provide a method for extricating a snowmobile bogged in snow that includes the steps of connecting one position of an elastic cord capable of significant elongation with the snowmobile, stretching the elastic cord between the one position and a second position of the elastic cord held at an anchoring location, and operating the bogged snowmobile to, in combination with the pulling force of the stretched elastic cord, extricate the snowmobile.

It is yet another object of this invention to provide a method for extricating a snowmobile bogged in snow that includes the steps of connecting one end of an elastic cord with the snowmobile and manually pulling on the other end of the elastic cord to stretch the cord and develop additional pulling force.

It is still another object of this invention to provide apparatus and methods for extricating a snowmobile bogged in snow that includes utilizing an elastic cord connectable between the snowmobile and an anchoring position and which is capable of accommodating up to about 400 lbs. of pulling force and cord elongation of at least about 20%.

It is yet another object of this invention to provide apparatus and methods for extricating a snowmobile bogged in snow that includes utilizing an elastic cord connectable at the snowmobile at one end and graspable at the other end, the cord when pulled being configured to develop up to at least about 200 lbs. of additional pulling force.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 3 is a partial plan view of the unit of FIG. 1 with portions cutaway;

FIG. 4 is a partial plan view of the unit of FIG. 2 with portions cutaway;

DESCRIPTION OF THE INVENTION

Figure 1:
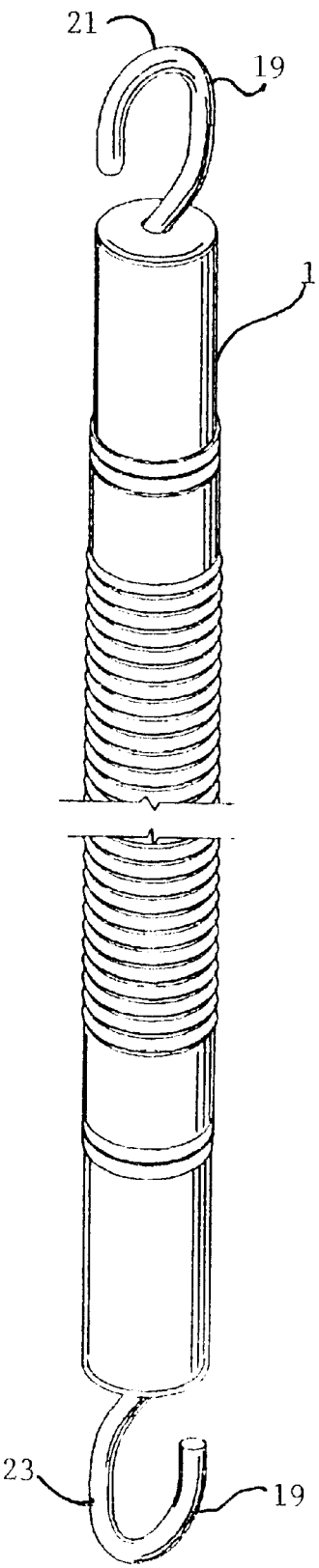
FIG. 1 is a partial perspective view of a first unit of the apparatus of this invention.
Figure 2:
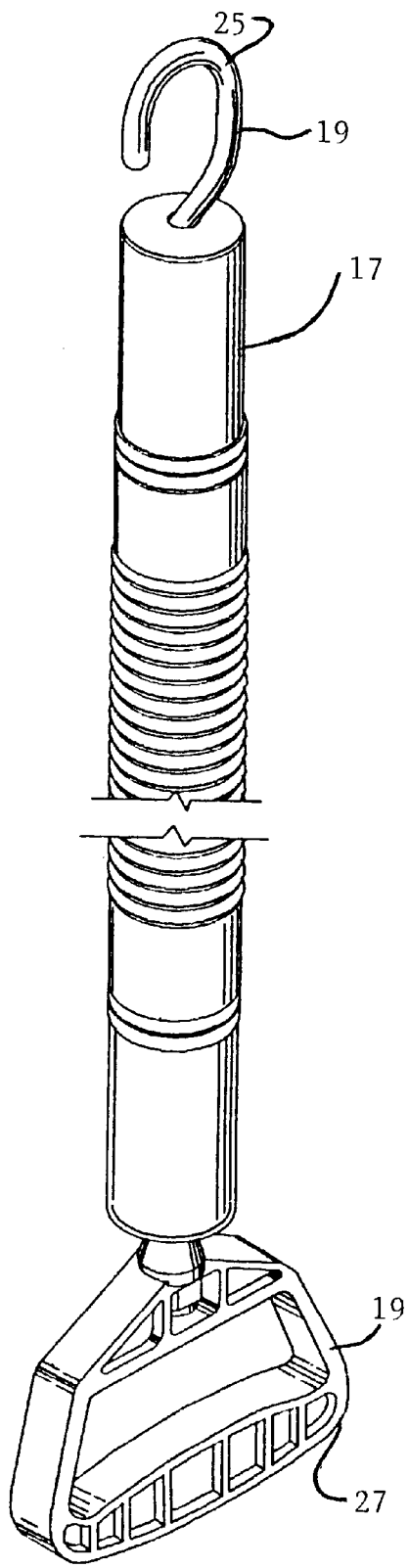
FIG. 2 is a partial perspective view of a second unit of the apparatus of this inventions.

FIGS. 1 and 2 show the basic units 15 and 17 of the overall apparatus of this invention. Units 15 and 17 are very similar in many regards, and are employed together to free a bogged snowmobile, depending on conditions and the difficulty of the encountered entrenchment. Each unit 15 and 17 is equipped with selected implement 19 combinations for different applications. Unit 15 includes spaced couplers 21 and 23 at opposite ends thereof. Unit 17 is provided with coupler 25 and graspable member 27 spaced from one another at opposite ends of the unit.

While couplers 21, 23 and 25 are illustrated herein as closed eye s-hooks, any known coupling mechanism of sufficient strength (breaking strength of 2000 lbs. is more than adequate) could be utilized, such as clasps, bars, links, ties, cables, hasps, fasteners, or the like. Likewise, while graspable member 27 as illustrated herein is a D-handle, any graspable device of sufficient strength could be utilized, such as loops, t-bars, cables, rings, double grasp handles, and so on.

Figure 5:
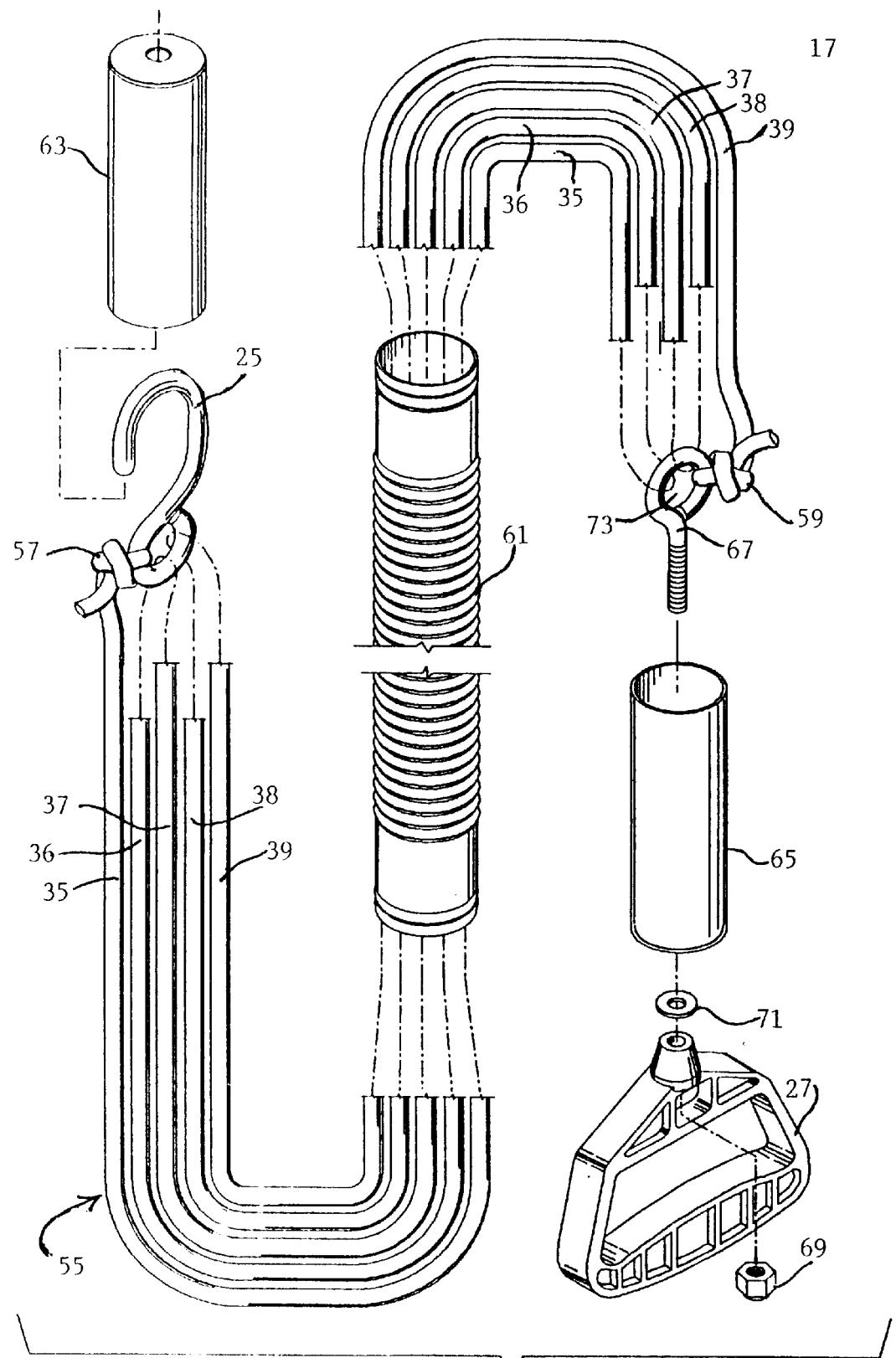
FIG. 5 is a partial exploded view of the unit of FIG. 2.
Figure 6A:
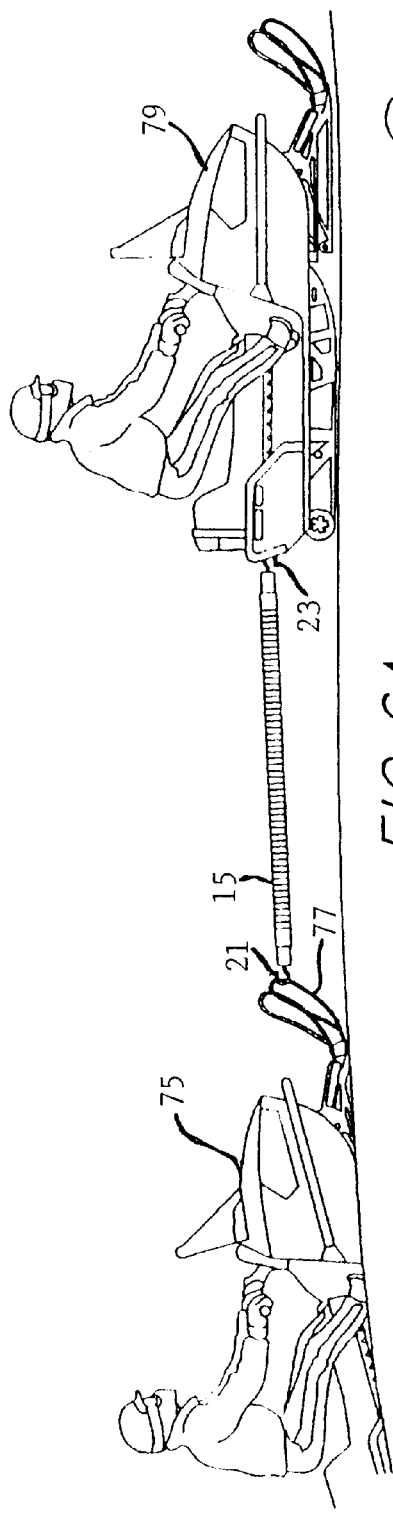
FIGS. 6A through 6E illustrate methods of using the units of FIGS. 1 and 2 of the apparatus of this invention to extricate a bogged snowmobile.
Figure 6B:
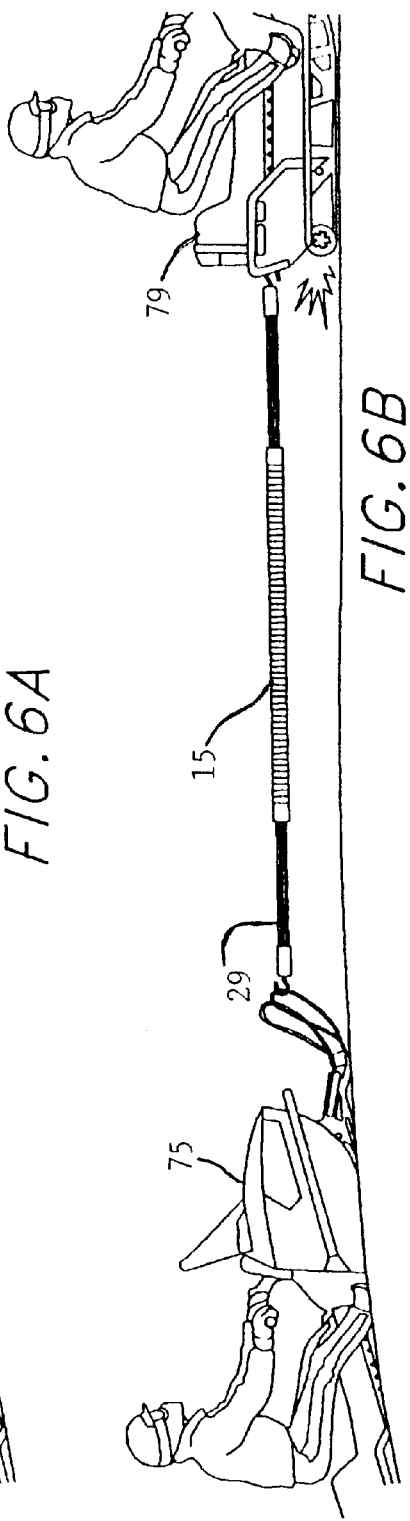
Figure 6C:
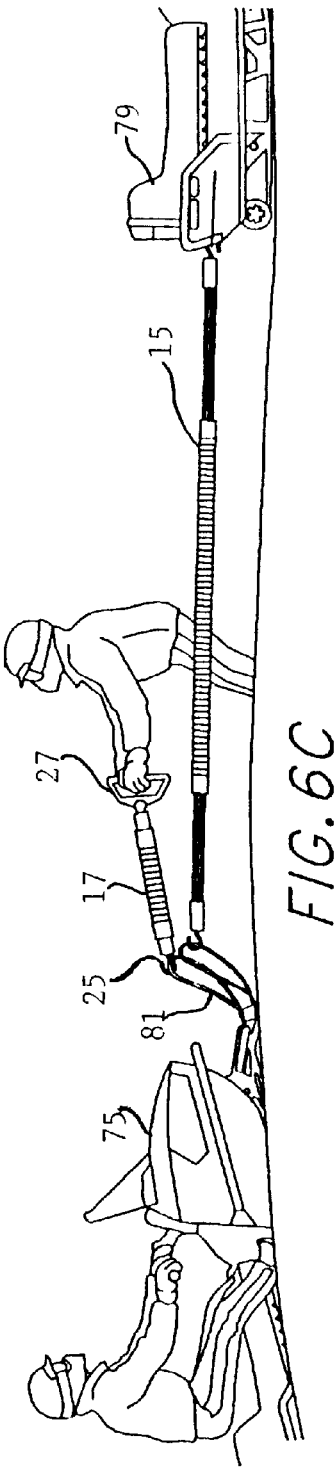
Figure 6D:
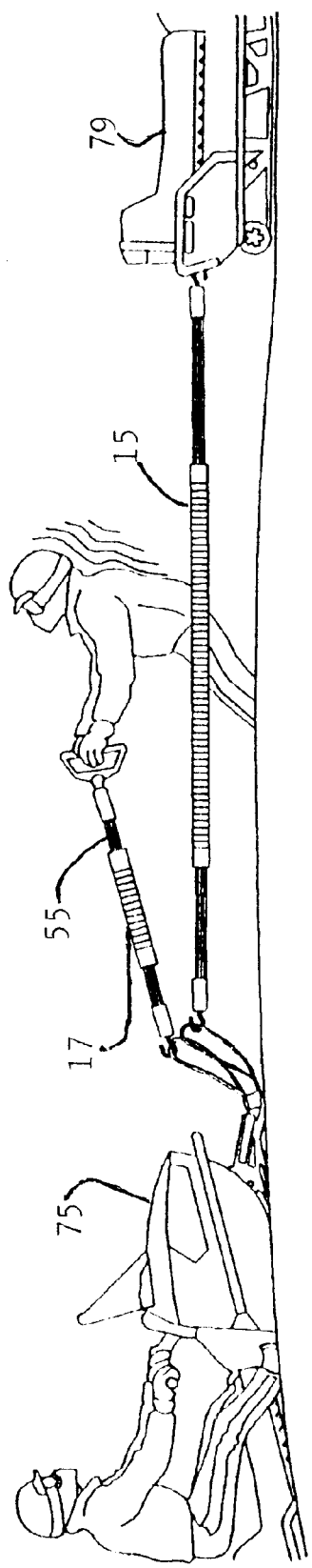
Figure 6E:
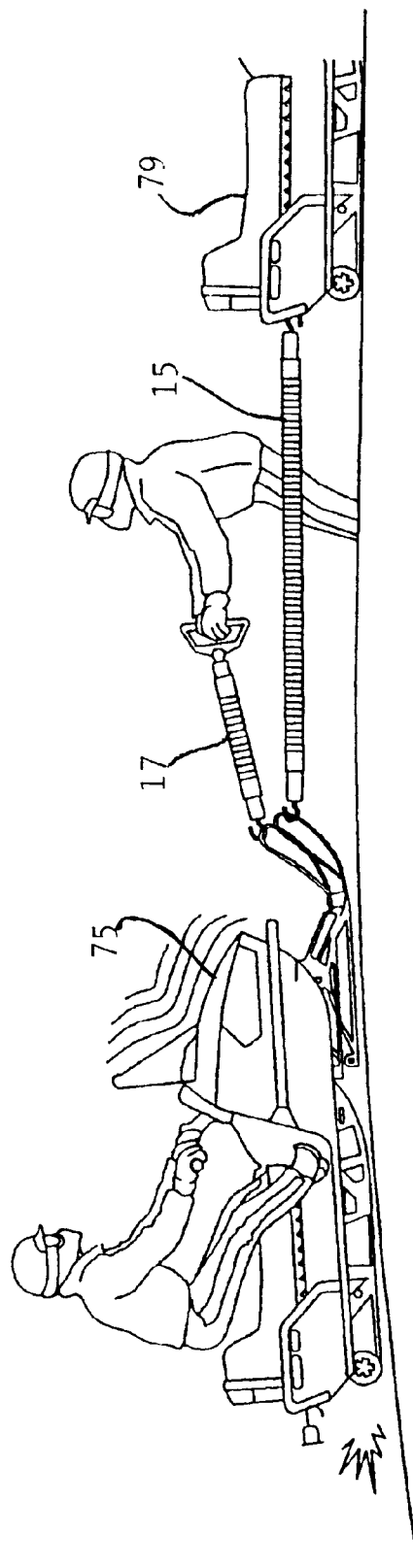

Turning to FIGS. 3 through 5, the units are shown in greater detail (FIG. 5 illustrates unit 17, though much of the disclosure therein pertains as well to unit 15 and will be used herein to illustrate some features of unit 15). Unit 15 (FIG. 3) has couplers 21 and 23 joined to opposite ends of multi-line stretchable cord 29 using in part, for example, slip knots 31 and 33 respectively (other means of securing the cord, such as clamps, rivets, collars, or glue, could be utilized). While cord 29 could be constructed of a single heavy line, as shown cord 29 is preferably defined by multiple lines (for example, five lines 35 through 39—see FIG. 5 for more complete illustration—though fewer or more lines could be utilized) of continuous elastic cord material formed by repeatedly looping the cord material through eyes 41 and 43 of couplers 21 and 23, respectively, before tying off one end, taking care to assure the constant spacing of the couplers by matching the lengths of the looped lines.

Cord material utilized to form cord 29 is preferably between ⅜" and ½" diameter Bungee #SPNL-12 stretch cord capable of significant elongation (to at least between about 20% to 90% and preferably up to 100% maximum in use). Utilizing 5 lines of the ½" material, a breaking resistance of about 3,700 lbs. of pulling force is achieved. Unstretched, cord 29 is between about 4' and 6' long (preferably about 5') between couplers 21 and 23.

Flexible jacket 45 is provided to control, or absorb, retraction forces which may be encountered during use of the unit, for example if a coupler were to dislodge while cord 29 was stretched or if the entrenched snowmobile were to lurch free. Cord 29 is slidably received Through jacket 45, unconnected thereto. Jacket 45 has an inside diameter selected to allow movement of the cord relative to the jacket (for example, about 1.5" for the five line cord described above), and is formed of material that is relatively (preferably substantially) more rigid than cord 29. Corrugated vinyl tubing has been found suited for providing the flexibility and relative rigidity desired to accomplish both storability of the unit and absorbance of retraction forces. Jacket 45 is of a length just slightly less that the unstretched length of cord 29 between couplers 21 and 23.

Collars 47 and 49 are fitted over closed eyes 41 and 43 and knots 31 and 33, respectively, and have openings 51 and 53. respectively, at one otherwise closed end of the collars to allow passage therethrough of the s-hook portion of couplers 21 and 23. Collars 47 and 49 have an outside diameter selected for slidable receipt into jacket 45 when cord 29 is unstretched (for example, between about 1.25" and 1.5" using the above examples). The collars may be formed of any material including tape, heat shrink tubing or, preferably, prefabricated vinyl cuffs).

Unit 17 (FIGS. 4 and 5) has coupler 25 and graspable handle 27 joined to opposite ends of stretchable cord 55 using in part, for example, slip knots 57 and 59 respectively. Cord 55 is, like cord 29, defined by multiple lines (for example, five lines 35 through 39) of continuous elastic cord material formed by repeated looping. Unstretched, cord 55 is between about 1.5' and 4' long between couplers 25 and 27 (preferably about 2'). Flexible jacket 61 is constructed and utilized like jacket 45, as are collars 63 and 65.

Graspable D-handle 27 is held on eye bolt 67 by nut 69 with washer 71 provided to assure free rotation of the handle. Eye 73 of bolt 67 serves the same function at graspable member 27 as do eyes 41 and 43 at couplers 21, 23 and 25.

In use, as illustrated in FIGS. 6A through 6E, unit 15 is connected by coupler 21 to bogged snowmobile 75, at ski 77 for example. Coupler 23 is connected, with cord 29 preferably in the unstretched state, to a companion's snowmobile 79, for example at the vehicles rear tow bar. The companion then moves snowmobile 79 forward, stretching cord 29 as much as 5' (100% elongation). This may apply more than 400 lbs. of pulling force at the front end of snowmobile 75 (depending upon the vehicles involved). The companion may then stop and lock his vehicle's brake and leave the vehicle, the pulling force thus remaining constant though unattended. Alternatively, where necessary instead of using another vehicle for an anchor, the cord could be stretched and connected to any available anchoring location by the entrenched vehicle's user.

Unit 17 is connected by coupler 25 to snowmobile 75, for example at the other ski 81. The companion grasps handle 27. and exerts his body to stretch cord 55 of unit 17, preferably at a slightly upward angle. An additional pulling force of over 200 lbs. can be exerted on vehicle 75 in this fashion. While both the unattended pulling force and the attended pulling force are being exerted, the operator of snowmobile 75 operates his vehicle, thus using the vehicle's track to create a pushing force. As snowmobile 75 begins to move, constant pulling force is maintained by the inherent retraction of the stretched elastic cords 29 and 55, thus avoiding backsliding.

The combined pulling forces of units 15 and 17, which nears or exceeds the weight of most standard snowmobiles, has proved very effective in assisting movement of entrenched snowmobiles, allowing the vehicle to essentially drive itself out of its entrenchment. In some less problematical situations, either one of units 15 and 17 by itself may be sufficient to aid extrication of a bogged snowmobile.

What is claimed is:

1. A unit for extricating a snowmobile bogged in snow comprising:

a stretchable cord;

first and second implements joined to said stretchable cord at positions spaced from one another;

a flexible jacket of corrugated tubing around but unconnected to said stretchable cord and intermediate said first and second implements, said jacket being relatively more rigid than said stretchable cord, of a length nearly equal to said stretchable cord between said implements when said stretchable cord is unstretched, and terminating at open ends; and first and second relatively rigid collars at said positions of said first and second implements, respectively, said collars covering said positions and adjoining parts of said implements and having diameters selected for slidable movement out of and into correspondence with said open ends of said jacket when said stretchable cord is stretched and relaxed, respectively;

whereby in use said stretchable cord is anchorable by said implements but said flexible jacket remains unanchored.

2. The unit of claim 1 wherein said first and second implements are couplers for securing said unit between the snowmobile and an anchoring location when in use.

3. The unit of claim 1 wherein said first implement is a coupler for securing said unit to the snowmobile and said second implement is a graspable member for use by one applying a stretching force to said unit when in use.

4. The unit of claim 1 wherein said stretchable cord has an unstretched length between said implements of between about 2' to 5', and wherein said stretchable cord is defined by multiple lines of material between said implements.

5. An apparatus for extricating a bogged snowmobile comprising:

a first unit including a stretchable cord and first and second couplers joined to said stretchable cord at positions spaced from one another, said first coupler being securable at the snowmobile and said second coupler being securable at an anchoring location; and a second unit including a stretchable cord with a third coupler and a graspable member joined to said stretchable cord of said second unit at positions spaced from one another, said third coupler being securable at the snowmobile and said graspable member for use by one applying a stretching force to said second unit.

6. The apparatus of claim 5 wherein said first unit includes a flexible jacket around but unconnected to said stretchable cord of said first unit and intermediate said first and second couplers of said first unit, said jacket being relatively more rigid than said stretchable cord of said first unit.

7. The apparatus of claim 6 wherein said second unit includes a flexible jacket around but unconnected to said stretchable cord of said second unit and intermediate said third coupler and said graspable member, said jacket being relatively more rigid than said stretchable cord of said second unit.

8. The apparatus of claim 7 wherein said flexible jackets of said first and second units have inside diameters, said apparatus further comprising protective cuffs at said positions where said first, second, and third couplers and said graspable member are joined to their respective stretchable cords, said cuffs having outside diameters less than said inside diameters of said flexible jackets.

9. The apparatus of claim 7 wherein said flexible jackets of said first and second units are formed of a corrugated tubing.

10. The apparatus of claim 5 wherein said stretchable cord of said first unit has an unstretched length between said first and second couplers of about 5', and wherein said stretchable cord of said second unit has an unstretched length between said third coupler and said graspable member of about 2'.

11. The apparatus of claim 5 wherein said stretchable cords of said first and second units are each defined by multiple lines of 0.5" diameter stretchable material.

12. A method for extricating a snowmobile bogged in snow comprising the steps of:
connecting one position of an elastic cord capable of significant elongation with the snowmobile;
stretching said elastic cord between said one position and a second position of the elastic cord held at an anchoring location; and
operating the bogged snowmobile to, in combination with pulling force of said stretched elastic cord, extricate the snowmobile.

13. The method of claim 12 further comprising the steps of connecting one end of a second elastic cord with the snowmobile and manually pulling on the other end of said second elastic cord to stretch the second elastic cord and develop additional pulling force.

14. The method of claim 13 wherein the step of pulling said second elastic cord is sufficient to develop up to at least about 200 lbs. of said additional pulling force.

15. The method of claim 12 wherein the step of stretching said elastic cord is sufficient to develop up to about 400 lbs. of said pulling force and a maximum cord elongation of up to at least about 90%.

16. The method of claim 12 wherein said anchoring location is at a second snowmobile, the step of stretching said elastic cord accomplished by movement of said second snowmobile away from said bogged snowmobile.

17. The method of claim 12 further comprising the step of jacketing said elastic cord with a material that is flexible yet relatively more rigid than said elastic cord to help absorb elastic cord retraction forces that may be encountered during extrication.

* * * * *